UNITED STATES PATENT OFFICE.

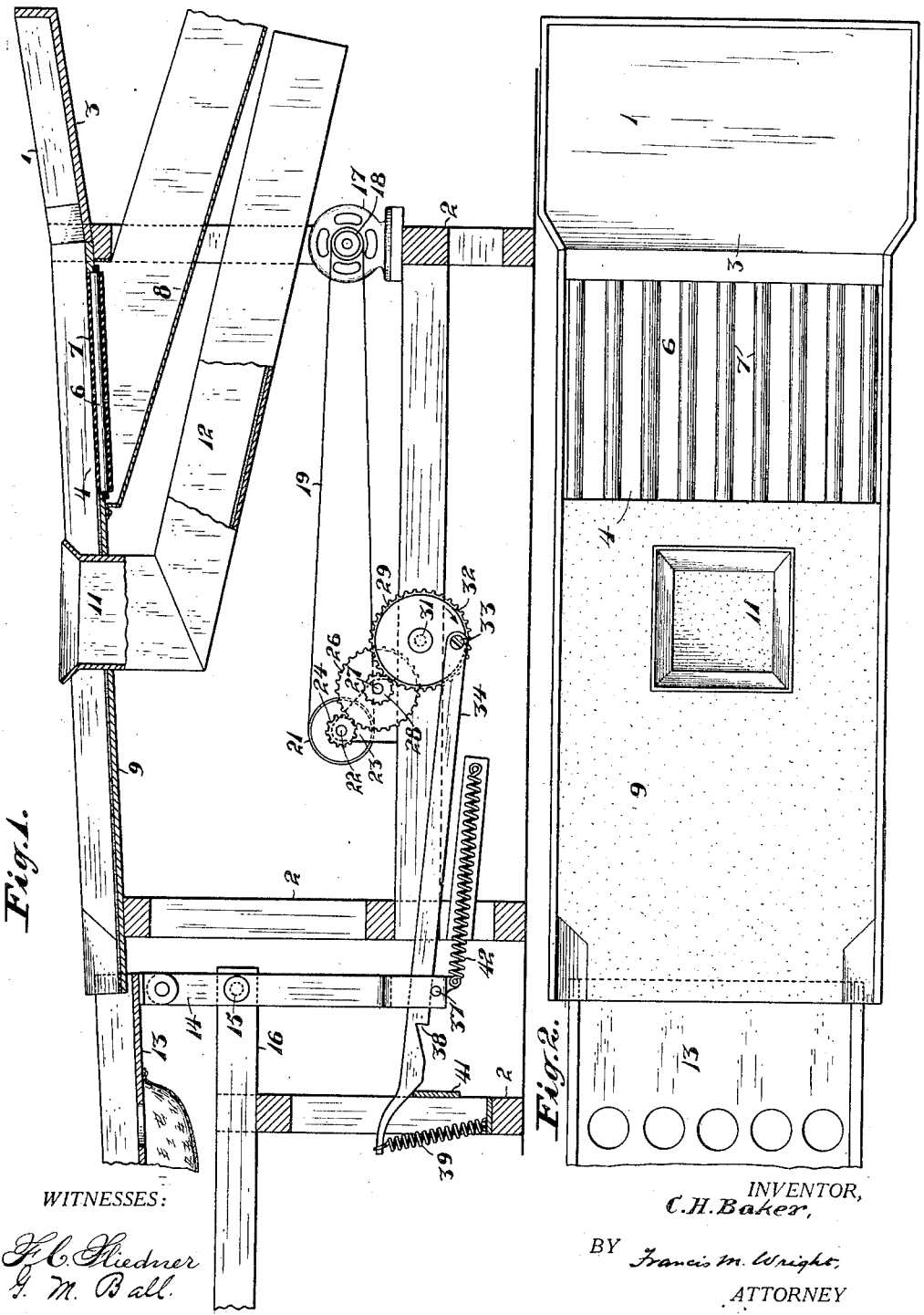

CAREY H. BAKER, OF WATSONVILLE, CALIFORNIA.

FRUIT-GRADING MACHINE.

1,089,034.  Specification of Letters Patent.  Patented Mar. 3, 1914.

Application filed September 22, 1913. Serial No. 791,074.

*To all whom it may concern:*

Be it known that I, CAREY H. BAKER, a citizen of the United States, residing at Watsonville, in the county of Santa Cruz and State of California, have invented new and useful Improvements in Fruit-Grading Machines, of which the following is a specification.

The present invention relates to improvements in fruit grading machines.

The object of the invention is to provide a machine of this character with which picked fruit may, without injury, be freed from leaves and other objects gathered in picking, may then be displayed on a table in order that imperfect fruit may be removed therefrom by hand, and then delivered on to a shaking grader table.

A further object of the invention is to provide cheap and simple means for efficiently shaking the table to cause the advance of the fruit thereover, for the purpose of grading it.

In the accompanying drawing, Figure 1 is a longitudinal vertical section of my improved machine; and Fig. 2 is a plan view thereof.

Since my improved machine has been devised more particularly for the purpose of grading apples, I shall herein describe it as so used. It is, however, to be understood that the invention is not limited to this use, but is intended for all uses for which it may be found applicable.

Referring to the drawing, 1 indicates a shallow receptacle, supported by a suitable frame 2, into which receptacle the apples are deposited, and from the sloping bottom 3 of which they are discharged on to a separator 4 consisting of round metal bars 6, covered with rubber tubes 7, to prevent injury to the fruit, said bars being spaced apart sufficiently only to permit leaves and other extraneous objects to drop therethrough, while preventing the apples from so dropping. These foreign substances drop into a chute 8, down which they slide, and from which they are deposited in a suitable place. From the separator the apples are moved on to a sloping selecting table 9 having side walls 10, near which stand operators, who move the apples along the table with their hands, at the same time picking out, and depositing in a hopper 11, extending through the table, the culls or imperfect apples, said hopper 11 communicating with a chute 12, by which said culls and the like are deposited in any suitable place. From the lower end of the selecting table the apples are discharged on to the upper end of a sloping grading table 13, by which they are graded according to their sizes. The construction of the table 13, however, forms no part of my present invention, and need not be further specified. The upper end of said table 13 is pivotally supported upon the upper end of a lever 14, pivoted at 15 upon a suitable support 16, and a longitudinally reciprocating or shaking motion is imparted to said table by the following mechanism. Upon the frame 2 is mounted an electric motor 17, the shaft of which carries a pulley 18 around which travels a band 19, traveling also around a pulley 21 supported upon a shaft 22 rotating in suitable bearings 23. Said shaft 22 carries a gear wheel 24 which meshes with a pinion 26 on a shaft 27 carrying a gear wheel 28 which meshes with a pinion 29 upon a shaft 31 carrying a wheel 32. To a wrist pin 33 on the wheel 32 is pivoted the rear end of a pusher rod 34, the forward end of which passes through the forked lower end of the lever 14, and can rest upon a pin 37 extending transversely through said lower end. The forward portion of the pusher rod is formed in its lower edge with a notch 38, of which the front side is sloping but the rear side extends at right angles to said edge, and, when said pusher rod moves rearwardly owing to its operative connection with the wheel 32, said rod can drop by gravity, assisted by a spring 39, of which the upper end is attached to the pusher rod, and the lower end is attached to the frame 2, and the rod can thus be engaged by said pin 37. The front end of the lower edge of said pusher rod is formed with an upwardly and forwardly sloping portion, which can engage the upper edge of a transverse plate 41 so that, as the pusher rod advances, it is also raised by said plate, until finally the notched portion of the rod is raised from off the pin 37. Thereupon the lower end of the lever immediately springs back under the action of a spring 42, of which the front end is attached to said lower end, and the rear end is supported by the frame 2 of the machine. By this movement there is imparted to the grading table a rapid forward motion. This rapid forward motion, together with the slow rearward motion, cause the apples or other fruit to advance over the grading table in a proper manner for grading the fruit.

I claim:—

The combination of a movable grading table, means for reciprocating the same, a sloping selecting table having side walls and discharging on to said grading table, the slope of said selecting table being less than that at which fruit rolls down the same, a hopper extending upwardly through the selecting table, a separator at the upper end of the selecting table, comprising longitudinal bars having substantially the same slope as said table, and a receptacle having a sloping bottom discharging on to said separator.

In testimony whereof I have hereunto set my hand in the presence of two subscribing witnesses.

CAREY H. BAKER.

Witnesses:
J. E. GARDNER,
ADAM BARBER.

Copies of this patent may be obtained for five cents each, by addressing the "Commissioner of Patents, Washington, D. C."